US009968990B2

(12) United States Patent
Kok et al.

(10) Patent No.: US 9,968,990 B2
(45) Date of Patent: May 15, 2018

(54) MODIFIED SILICON OIL FOR WAX-FREE DIE CASTING LUBRICANTS

(71) Applicant: Henkel AG & Co. KGaA, Duesseldorf (DE)

(72) Inventors: Douwe Marten Kok, Scheemda (NL); Martijn Quico Slagt, Bronnegerveen (NL); Gerrit Jan Odink, Roermond (NL); Johannes Hendrikus Gerhardus Franciscus Braam, Stadskanaal (NL)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days. days.

(21) Appl. No.: 15/284,659

(22) Filed: Oct. 4, 2016

(65) Prior Publication Data
US 2017/0021408 A1 Jan. 26, 2017

Related U.S. Application Data

(63) Continuation of application No. PCT/EP2015/057364, filed on Apr. 2, 2015.

(30) Foreign Application Priority Data

Apr. 7, 2014 (GB) .................... 1406234.3

(51) Int. Cl.
C08G 77/06 (2006.01)
B22C 1/14 (2006.01)
C08G 77/442 (2006.01)
C10M 155/04 (2006.01)
C10M 173/02 (2006.01)
B22D 17/20 (2006.01)
B22D 29/00 (2006.01)
C08G 77/04 (2006.01)
C23C 26/00 (2006.01)
C08G 77/12 (2006.01)

(52) U.S. Cl.
CPC ............ B22C 1/14 (2013.01); B22D 17/2007 (2013.01); B22D 29/00 (2013.01); C08G 77/04 (2013.01); C08G 77/06 (2013.01); C08G 77/442 (2013.01); C10M 155/04 (2013.01); C10M 173/02 (2013.01); C23C 26/00 (2013.01); C08G 77/12 (2013.01); *C10M 2229/041* (2013.01); *C10M 2229/044* (2013.01); *C10N 2240/58* (2013.01)

(58) Field of Classification Search
None
See application file for complete search history.

(56) References Cited

U.S. PATENT DOCUMENTS

| 5,516,870 | A | * | 5/1996 | Biggs | C07F 7/0829 528/15 |
| 5,578,692 | A | * | 11/1996 | Biggs | C07F 7/0879 525/478 |
| 5,783,719 | A | * | 7/1998 | Sun | C08G 77/38 528/12 |
| 5,959,056 | A | | 9/1999 | Beach et al. | |
| 6,211,323 | B1 | * | 4/2001 | Akinaga | A61K 8/891 528/15 |
| 6,458,461 | B1 | * | 10/2002 | Blair | C08G 77/50 106/287.13 |
| 6,635,606 | B2 | | 10/2003 | Maeda et al. | |
| 6,706,811 | B2 | * | 3/2004 | Ohashi | C08K 3/22 516/53 |
| 7,226,502 | B2 | * | 6/2007 | Terry, Jr. | C08G 77/38 106/287.13 |
| 2002/0183445 | A1 | | 12/2002 | Ohashi | |
| 2005/0167071 | A1 | | 8/2005 | Kendall, Sr. et al. | |
| 2010/0178266 | A1 | | 7/2010 | Huggins et al. | |
| 2015/0030796 | A1 | * | 1/2015 | Boardman | C09J 7/0228 428/41.4 |

FOREIGN PATENT DOCUMENTS

EP 1134060 A2 9/2001
JP 201111524 A 6/2011

OTHER PUBLICATIONS

International Search Report for PCT/EP2015/057364, dated Jun. 2, 2015. All references cited in the International Search Report are listed herein.

* cited by examiner

Primary Examiner — Robert S Loewe
(74) Attorney, Agent, or Firm — Mary K. Cameron

(57) ABSTRACT

The present invention relates to a mixture of polyalkylsiloxanes obtainable through a hydrosilylation reaction wherein a mixture of monounsaturated olefins is reacted with an amount of one or more polyalkylhydrosiloxanes in the presence of a hydrosilylation catalyst. Furthermore, the invention concerns polyalkylsiloxane comprising alkyl side chains consisting of linear or branched alkyl groups with 40 to 60 carbon atoms, with 16 to 30 carbon atoms, and 6 to 15 carbon atoms. In addition, the present invention relates to water-based compositions suitable for use in metal casting processes as a mold release agent comprising a mixture of polyalkylsiloxanes, a non-ionic surfactant having a HLB value of at least 8, and less than 20 wt.-% of waxes. In addition, the present invention relates to the use of the polyalkylsiloxanes and mixtures of polyalkylsiloxanes.

20 Claims, No Drawings

MODIFIED SILICON OIL FOR WAX-FREE DIE CASTING LUBRICANTS

This invention relates to new silicones, processes for the production thereof and their uses, e.g., as die casting lubricants.

Waxes are commonly used in pressure die casting release agents, mostly as aqueous emulsions, to provide good lubrication and release, especially for larger and heavy castings. However, the use of waxes leads to build-up of wax on the spray nozzles, which eventually blocks them and requires regular extensive cleaning of the spray equipment. Furthermore, due to residual wax sticking to the mold, such processes necessitate also regular cleaning of the molds with concomitant downtime of the casting equipment. Additionally, the use of waxes can entail excessive cleaning of the castings in order to achieve satisfactory painting or plating thereof.

U.S. Pat. No. 6,635,606 B2 discloses a release agent being an aqueous emulsion comprising a mixture of a dimethyl silicone and an alkyl-modified silicone having an alkyl chain of 6-18 carbon atoms, surfactant, and water. The kinematic viscosity of the alkyl-modified silicone is 100-3000 cSt at 25° C.

U.S. Pat. No. 6,211,323 B1 relates to triorganosiloxy-endblocked poly(methyl(C6-C40alkyl)siloxane)-poly(methyl(aralkyl)siloxane)-poly(methyl(C2-C4alkyl)siloxane) terpolymers and their use as release agents.

US 2005/0167071 A1 discloses die cast release agents for lubricating at die cast mold comprising a silicone wax compound having a molecular weight from 9,000 to 50,000 and a melting point of about 90 to 220° F., wherein the silicone wax compound has alkyl side groups having at least 18 carbon atoms. In addition, several wax-free pressure die casting release agents have been marketed based on polysiloxanes functionalized with medium length alkylgroups. However, all these lubricants are not able to compete fully with wax containing products, especially in large heavy castings.

Accordingly, it is an object of the present invention to provide an alternative pressure die casting release agent which has the same lubricating properties and casting release rates as wax-based pressure die casting release agents without having the disadvantages connected thereto, e.g., requiring the cleaning of the molding after release of the cast and requiring cleaning the castings prior to painting or plating of the castings.

In a first aspect, the present invention thus relates to a mixture of polyalkylsiloxanes obtainable through a hydrosilylation reaction wherein a mixture of monounsaturated olefins consisting of
- 1-20 mol % of olefins with 40 to 60 carbon atoms,
- 1-20 mol % of olefins with 16 to 30 carbon atoms, and
- 60-98 mol % of olefins with 6 to 15 carbon atoms is reacted with an amount of one or more polyalkylhydrosiloxanes in the presence of a hydrosilylation catalyst while each polyalkylhydrosiloxane comprises a repeating unit according to the general structure (I):

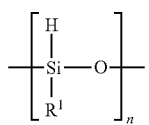

(I)

with n indicating the number of repeating units being in a range of from 5 to 10,000;
with the residue $R^1$ being selected from linear or branched alkyl groups with less than 6 carbon atoms.

In another aspect, the present invention relates to a polyalkylsiloxane comprising repeating units according to general structure (II):

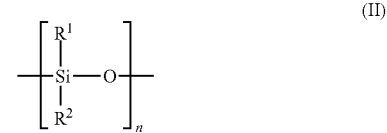

(II)

wherein n indicates the number of repeating units comprised in the polyalkylsiloxane, wherein n is an integer of 5 to 10,000 and
wherein residue $R^1$ is selected from the group consisting of linear or branched alkyl groups with less than 6 carbon atoms,
wherein
  a) in 1-20% of the repeating units $R^2$ is selected from the group consisting of linear or branched alkyl groups with 40 to 60 carbon atoms,
  b) in 1-20% of the repeating units $R^2$ is selected from the group consisting of linear or branched alkyl groups with 16 to 30 carbon atoms, and
  c) in 60-98% of the repeating units $R^2$ is selected from the group consisting of linear or branched alkyl groups with 6 to 15 carbon atoms,
  d) in 0-10%, preferably less than 10%, of the repeating units $R^2$ is H.

In a further aspect, the present invention relates to a water-based composition suitable for use in metal casting processes as a mold release agent comprising:
  1-50 wt.-% of a mixture of polyalkylsiloxanes or polyalkylsiloxane as defined above,
  1-15 wt.-% of a non-ionic surfactant having a HLB value of at least 8, and
  less than 20 wt.-%, preferably less than 10 wt.-%, more preferably less than 1 wt.-%, even more preferably less than 0.1 wt.-% of waxes.

In another aspect, the present invention relates to the use of polyalkylsiloxanes as a mold release agent in a metal casting process, wherein i) the polyalkylsiloxanes are a mixture of polyalkylsiloxanes as defined herein, ii) the polyalkylsiloxanes are polyalkylsiloxanes as defined herein, or iii) the polyalkylsiloxanes comprise a repeating unit according to the following general structure (Ill):

(III)

wherein n indicates the number of repeating units being in a range of from 5 to 10,000;
wherein for each repeating unit the residue $R^1$ is independently selected from linear alkyl groups with less than 6 carbon atoms; and
wherein for each repeating unit the residue $R^2$ is independently selected from hydrogen or linear or branched alkyl groups having 6 to 15 carbon atoms, 16 to 30 carbon atoms or 40 to 60 carbon atoms, while the fraction of repeating units with a residue $R^2$ being hydrogen is less than 0.1, being a linear or branched alkyl group having 16 to 30 is in a range of from 0.01-0.2, being a linear or branched alkyl group having 40 to 60 carbon atoms is in a range of from 0.01-0.2, and being a linear or branched alkyl group having 6 to 15 carbon atoms is in a range of 0.6-0.98.

Further embodiments are defined in the appended claims.

The inventors of the present invention surprisingly found that incorporation of long alkyl chains in polysiloxanes confers a polysiloxane polymer lubricating properties resembling those of waxes in pressure die casting release agents. Furthermore, the inventors found that the use of mixtures of short, medium and long alkyl chains on the polysiloxane backbone gives excellent control over its viscosity. Without wishing to be bound to a particular theory, it is believed that the long alkyl groups provide wax-type characteristics to the polysiloxane with concomitant advantageous characteristics in pressure die casting while the short and medium alkyl chains simultaneously eliminate the disadvantages of wax-containing release agents.

These features are advantageous for application of this compound in wax-free pressure die casting release agents. Specifically, application of these modified polysiloxanes in pressure die casting release agents combines the advantageous lubricating properties of waxes without the disadvantageous build-up of waxes on spray nozzles and mold and paintability issues encountered in wax-containing release agents.

Thus, use of a wax-free lubricant makes cleaning prior to painting or plating obsolete.

Furthermore, absence of additional wax in the lubricant prevents build-up of solid wax residues on the nozzles and dies. This circumvents the need for regular time-consuming cleaning of the spray equipment. Furthermore, the resulting castings are cleaner and more suitable for subsequent painting or plating without the need of additional cleaning steps. In addition, the inventive lubricant shows better performance compared to current wax-free die casting lubricants.

These new and improved polyalkylsiloxane derivatives may be in the form of silicone oil.

This compound may be directly used as a lubricant or included in a wax-free release agent for pressure die casting.

The new polyalkylsiloxane derivatives are particularly advantageous in water-based emulsions.

However, a second field of application is use of the new modified silicon oil in casting processes where the silicon oil is applied directly (not as emulsion) on the mold. Waxes cannot be applied in this technology due to their insolubility in silicon oils. The use of the new modified silicon oil in this technology thus allows incorporation of wax-type characteristics in the silicon oil.

Accordingly, the present invention relates to a modified polysiloxane which is prepared by hydrosilylation of polymethylhydrosiloxane with a mixture of short (C6-C15), medium (C16-C30), and long α-olefins (>040, preferably C40-C60) according to state of the art methodology. The ratio of the constituting α-olefins is chosen such to provide a modified polysiloxane with a high content of long alkyl groups while keeping the polysiloxane liquid with a kinematic viscosity of 200-20000 mPa·s at 25° C. The thus formed modified polysiloxanes can be applied in wax-free die casting release agent.

In certain embodiments, the modified polysiloxanes can be directly applied to the mold.

In further embodiments, the modified polysiloxanes are included in an aqueous emulsion. More specifically, the die casting release agent may be an aqueous emulsion comprising the modified polysiloxane (5-50 wt.-%), a surfactant mixture (1-15 wt.-%) and water adding up to 100 wt.-%.

Typically, the modified polysiloxane is prepared as follows: The modified silicone oil is prepared by addition of the appropriate mixture of α-olefins to polymethylhydrosiloxane using a platinum catalyst giving a Si—H conversion of >94%. The modified polysiloxane may be a polymethylsiloxane functionalized with a mixture of long alkyl groups (>C40, preferably C40-C60, 1-20 mol %), medium sized alkyl groups (C16-C30, 1-20 mol %), and the remainder with short alkyl groups (C6-C15). The modified polysiloxane preferably has a kinematic viscosity below 20000 mPa·s, preferably below 7000 mPa·s at 25° C. to allow successful emulsification.

Accordingly, the present invention relates to mixture of polyalkylsiloxanes obtainable through a hydrosilylation reaction wherein a mixture of monounsaturated olefins consisting of 1-20 mol % of olefins with 40 to 60 carbon atoms,
1-20 mol % of olefins with 16 to 30 carbon atoms, and
60-98 mol % of olefins with 6 to 15 carbon atoms
is reacted with an amount of one or more polyalkylhydrosiloxanes in the presence of a hydrosilylation catalyst while each polyalkylhydrosiloxane comprises a repeating unit according to the general structure (I):

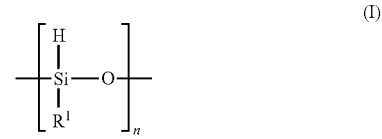

(I)

with n indicating the number of repeating units being in a range of from 5 to 10,000;
with the residue $R^1$ being selected from linear or branched alkyl groups with less than 6 carbon atoms.

The term "olefin", as used herein, refers to monounsaturated olefins, hydrocarbons having a single ethylenic double bond such as normal and branched chain aliphatic olefins. Olefins do not comprise double unsaturated bonds.

The term "short" olefin or alkyl relates to C6-C15 olefins or alkyls. The term "medium" olefins or alkyls relates to C16-C30 olefins or alkyls. The term "long" olefins or alkyls relates to C40-C60 olefins or alkyls.

The term "mol % of olefin" relates to the molar ratio of a short, medium, or long chain olefin in a reaction with regard to the total moles of olefin in the reaction.

The term "polyalkylhydrosiloxane" refers to a polymer comprising repeating units according to a general structure (I). In certain embodiments, the polymer further comprises trimethyl groups as terminators.

The term "hydrosilylation", also called catalytic hydrosilation, describes the addition of Si—H bonds across unsaturated bonds. Typically, the reaction is conducted catalytically and usually the substrates are unsaturated organic compounds. Alkenes and alkynes give alkyl and vinyl silanes. A platinum catalyst is usually employed.

Olefins with 6 to 15 carbon atoms are preferably selected from the group of olefins with 10 to 14 carbon atoms. Most preferably, the olefin with 6 to 15 carbon atoms selected for use in the present invention is 1-dodecene.

In some embodiments, 2-10 mol %, preferably about 5 mol %, olefins consist of linear or branched alkyl groups with 40 to 60 carbon atoms.

In various embodiments, 2-15 mol %, preferably about 5 mol %, olefins consist of linear or branched alkyl groups with 16 to 30 carbon atoms.

In certain embodiments, 60-96 mol % or 75-96 mol %, preferably 60-90 mol % or 75-90 mol % olefins consist of linear or branched alkyl groups with 6 to 15 carbon atoms.

In certain embodiments, n is an integer of from 5 to 10,000, 5 to 7,000, or 5 to 5,000. Preferably, n is an integer of from 5 to 2,500, 5 to 1,000, or 5 to 500. More preferably, n is an integer of from 5 to 250, 5 to 200, 5 to 100. Even more preferably, n is an integer of from 5 to 50, 5 to 40, 5 to 30, 5 to 29, 5 to 28, 5 to 27, 5 to 26, or 5 to 25.

In some embodiments, $R^1$ is selected from the group consisting of methyl, ethyl, linear or branched C3-C5 alkyl. In some embodiments, $R^1$ is selected from the group consisting of methyl, ethyl, n-propyl, 1-methyl-ethyl, n-butyl, tert-butyl, 1-methyl propyl, 2-methyl propyl, n-pentyl, 2-pentyl, 3-pentyl, 2-methyl butyl, 3-methyl butyl, 3-methyl but-2-yl, 2-methyl but-2-yl, and 2,2,-dimethyl propyl. In certain embodiments, $R^1$ is selected from the group consisting of H, ethyl, n-propyl, 1-methyl ethyl. In certain embodiments, $R^1$ is H.

Typically, the resulting mixture of polyalkylsiloxanes is an oil.

In certain embodiments, the mixture of polyalkylsiloxanes is obtained in a hydrosilylation reaction being conducted with an amount of polyalkylhydrosiloxanes that equals at least 60%, preferably at least 80% of the stoichiometric amount, but preferably equals not more than the stoichiometric amount. In certain embodiments, the reaction is performed with an amount of polyalkylhydrosiloxanes that equals at least 60%, 70%, 80%, 90%, 95%, 97.5%, 99%, or 99.5% of the stoichiometric amount.

In some embodiments, the mixture of polyalkylsiloxanes is obtained in a hydrosilylation reaction being conducted with polyalkylhydrosiloxanes that are at least partially selected from polymethylhydrosiloxanes, and preferably with polyalkylhydrosiloxanes wherein at least 80 mol % of the repeating units according to the general structure (I) have a residue $R^1$ being a methyl group.

However, in some embodiments in the method of the present invention polyalkylhydrosiloxanes are employed, wherein at least 80, 85, 95, 97.5, 98, 99, or 99.5 mol % of the repeating units according to the general structure (I) have a residue $R^1$ being a methyl group.

In further embodiments, the mixture of polyalkylsiloxanes is obtained in a hydrosilylation reaction wherein at least 80 mol % of the monounsaturated olefins are selected from α-olefins.

Preferably, the mixture of polyalkylsiloxanes is obtained in a hydrosilylation reaction wherein at least 80 mol %, 90 mol %, 95 mol %, 97.5 mol %, 99 mol %, or 99.5 mol % of the monounsaturated olefins are selected from α-olefins.

In various embodiments, the mixture of polyalkylsiloxanes is obtained in a hydrosilylation reaction wherein the hydrosilylation catalyst is a platinum catalyst. The platinum catalyst may be selected from the group consisting of chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum black, platinum acetylacetonate, platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, $RhCl_3(Bu_2S)_3$, speier's catalyst, and karstedt's catalyst. Preferably, the platinum catalyst is speier's or karstedt's catalyst, more preferably speier's catalyst.

In some embodiments, the mixture of polyalkylsiloxanes is obtained in a hydrosilylation reaction wherein the reaction mixture is kept at temperature in the range of from 80 to 180° C., preferably for a time sufficient to yield a mixture of polyalkylsiloxanes that contains not more than 10 mol % Si—H bonds. Preferably, the reaction is carried out for a time sufficient to yield a mixture of polyalkylsiloxanes containing not more than 10, 9, 8, 7, 6, 5, 4, 3, 2, or 1 mol % Si—H bonds. Preferably, the reaction is carried out for a time sufficient to yield a mixture of polyalkylsiloxanes containing not more than 6 mol % Si—H bonds.

In certain embodiments, the mixture of polyalkylsiloxanes is obtained in a hydrosilylation reaction wherein the weight fraction of an inert liquid vehicle that acts as a solvent for the amount of the one or more polyalkylhydrosiloxanes and/or the mixture of monounsaturated olefins may be less than 20 wt.-%, preferably less than 10 wt.-%, more preferably less than 1 wt.-%. Suitable inert liquid vehicles may be selected from, but not limited to, aprotic solvents, such as toluene or tetrahydrofurane. The reaction is preferably carried without any such inert liquid vehicle. Any residual solvent is preferably removed after completion of the reaction. The catalyst may be removed from the reaction mixture by methods known in the art In further embodiments, the mixture comprises polyalkylsiloxanes wherein the ratio of $R^2$ falling within the scope of linear or branched alkyl groups having 16 to 30 carbon atoms and linear or branched alkyl groups having 40 to 60 carbon atoms is in the range of from 2:3 to 3:2. This means that the polyalkylsiloxanes comprise repeating units wherein some substituents $R^2$ fall within the scope of linear or branched alkyl groups with 40 to 60 carbon atoms and other substituents $R^2$ falling within the scope of linear or branched alkyl groups with 16 to 30 carbon atoms.

In another aspect, the present invention relates to a polyalkylsiloxane comprising repeating units according to general structure (II):

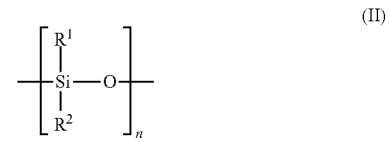

(II)

wherein n indicates the number of repeating units comprised in the polyalkylsiloxane, wherein n is an integer of 5 to 10,000 and residue $R^1$ is selected from the group consisting of linear or branched alkyl groups with less than 6 carbon atoms,
wherein
  a. in 1-20% of the repeating units $R^2$ is selected from the group consisting of linear or branched alkyl groups with 40 to 60 carbon atoms,
  b. in 1-20% of the repeating units $R^2$ is selected from the group consisting of linear or branched alkyl groups with 16 to 30 carbon atoms, and
  c. in 60-98% of the repeating units $R^2$ is selected from the group consisting of linear or branched alkyl groups with 6 to 15 carbon atoms,
  d. in 0-10%, preferably less than 10%, of the repeating units $R^2$ is H.

In these embodiments, the percentages of the repeating units as defined in a)-d) add up to 100%. The percentages given relate to the total number of repeating units in the polyalkylsiloxane.

$R^2$ of group a) is selected from the group consisting of linear or branched alkyl groups with 40 to 60 carbon atoms. In 1-20% of the repeating units $R^2$ is chosen from group a).

$R^2$ of group b) is selected from the group consisting of linear or branched alkyl groups with 16 to 30 carbon atoms. In 1-20% of the repeating units $R^2$ is chosen from group b).

$R^2$ of group c) is selected from the group consisting of linear or branched alkyl groups with 6 to 15 carbon atoms. In 60-98% of the repeating units $R^2$ is chosen from group c).

$R^2$ of group d) is H. In 0-10%, preferably less than 10%, of the repeating units $R^2$ is chosen from group d).

$R^1$ of general structure (II) is defined identical to $R^1$ in general structure (I).

In certain embodiments, the polyalkylsiloxane has a kinematic viscosity of 200 to 20000 mPa·s at 25° C., preferably of 200 to 7000 mPa·s at 25° C.

The term "kinematic viscosity" refers to a viscosity which is determined by measuring the dynamic viscosity μ, and dividing the dynamic viscosity μ by the density of the fluid ρ. Methods for determining the dynamic viscosity are well known in the art.

In further embodiments, the polyalkylsiloxane is defined as above, wherein for fraction c) $R^2$ is selected from the group consisting of linear or branched alkyl groups with 10 to 14 carbon atoms. In certain embodiments, $R^2$ of fraction c) is selected from the group consisting of hexyl, heptyl, octyl, nonyl, decyl, undecyl, and dodecyl. Preferably, $R^2$ of fraction c) is dodecyl.

In some embodiments, repeating units according to fraction a), i.e. having an $R^2$ that is a linear or branched alkyl group with 40 to 60 carbon atoms, make up 2-10%, preferably about 5% of the total repeating units in the polyalkylsiloxane.

In various embodiments, repeating units with $R^2$ falling within the scope of fraction b) make up 2-15%, preferably about 5% of the total repeating units in the polyalkylsiloxane.

In certain embodiments, repeating units with $R^2$ falling within the scope of fraction c) make up 60-96% or 75-96%, preferably 60-90% or 75-90% of the total repeating units in the polyalkylsiloxane.

In some embodiments, the molar ratio of fraction a) to fraction b) is in the range of from 2:3 to 3:2.

According to some embodiments, substituent $R^1$ of each repeating unit according to general structure (II) is a methyl group. In further embodiments, in at least 80% of the repeating units according to general structure (II) $R^1$ is a methyl group. In certain embodiments, in at least 80, 90, 95, 97.5, 99, or 99.5% of the repeating units according to general structure (II) $R^1$ is a methyl group.

Preferably, the polyalkylsiloxane of the present invention is an oil. In that case the polyalkylsiloxane can be used as die casting lubricant without further additives.

As mentioned above, the modified polysiloxane may be included in a water-based emulsion in combination with a suitable surfactant and water.

In certain embodiments, the water-based emulsion comprises a surfactant mixture. The surfactant mixture comprises emulsifying agents which are able to form stable emulsions with the modified polysiloxanes. In certain embodiments, the surfactant mixture may be a mixture of ethoxylated oxo-alcohols.

The term "ethoxylation" refers to the addition of ethylene oxide to alcohols to give a surfactant.

The term "oxo alcohols" means alcohols that are prepared by adding carbon monoxide (CO) and hydrogen to an olefin to obtain an aldehyde using the hydroformylation reaction and then hydrogenating the aldehyde to obtain the alcohol.

The term "ethoxylated oxo-alcohols" relates to oxo-alcohols which have undergone ethoxylation.

For example, a surfactant for use in the water-based emulsion may be a mixture of polysorbate 85 and ethoxylated (6-8) tridecyl alcohol.

In some embodiments, the ethoxylated oxo-alcohols are used in the water-based emulsion at weight ratios of 1:4 to 1:10 with respect to the modified polysiloxane. Additionally, other surfactants, either anionic, nonionic and/or cationic may be used in the water-based emulsion.

Accordingly, the present invention also relates to a water-based composition suitable for use in metal casting processes as a mold release agent comprising a) 1-50 wt.-% of a mixture of polyalkylsiloxanes or polyalkylsiloxane as defined herein, b) 1-15 wt.-% of a non-ionic surfactant having a HLB value of at least 8, and c) less than 20 wt.-%, preferably less than 10 wt.-% of waxes.

In various embodiments, the mold release agent preferably comprises less than 1 wt.-%, more preferably less than 0.1 wt.-%, especially preferred less than 0.01 wt.-% of waxes.

In certain embodiments, the content of modified polysiloxane in the aqueous emulsion is 1-50 wt.-%, preferably 5-50 wt.-%, more preferably 5-30 wt.-%.

Furthermore, the content of surfactant in the aqueous emulsion may be 1-15 wt.-%, preferably 5-15 wt.-%, more preferably 5-10 wt.-%.

The term "wax" or "waxes" as used herein relates to a class of organic chemical compounds that are insoluble in water and are plastic (malleable) at 20° C. and melt above 45° C. to give a low viscosity liquid. Waxes are insoluble in water but soluble in organic, nonpolar solvents. All waxes are organic compounds, both synthetic and naturally occurring.

The term "plastic", as used in connection with wax, relates to its deformation when undergoing non-reversible changes of shape in response to applied forces. The term "malleable" refers to the ability of wax to deform under compressive stress. Examples of waxes being used in prior art mold-release compositions are polyethylenes and polypropylenes that may be modified. The term "modified" in connection with polyethylenes and polypropylenes means esterified or saponified polyethylenes and polypropylenes.

Also, other components may be incorporated in the die casting release agent, e.g., corrosion inhibitors, antimicrobials, and emulsions of various natural or synthetic oils.

Preferably, the water-based composition according to the present invention is an oil-in-water emulsion.

Also encompassed by the present invention is the preparation of the die casting release agent of the present invention.

The release agent may be prepared by combining the modified polysiloxane, the emulsifier, and water using an appropriate emulsifying apparatus to produce a stable oil in water emulsion followed by addition of water and optional other constituents.

Generally, application of the die casting release agent is preferably done by spray coating. Typically, the die casting release agent is employed in a dilution. In certain embodiments, the die casting release agent is employed in a 1-200 fold dilution, preferably 1-100 dilution, 1-50 dilution, or 1-20 dilution.

These water-based compositions are advantageous, because they have wax-like or even improved lubricating properties while being devoid of or almost devoid of wax. As waxes are absent or almost absent, the compositions do not have the typical disadvantages connected with wax-based lubricants, e.g., the need of regular extensive cleaning of the spray equipment, i.e. spry nozzles. Also, occurrence of residual wax sticking to the mold is avoided and the thereto connected need of regular cleaning of the molds with concomitant downtime of the casting equipment. Moreover, excessive cleaning of the castings in order to achieve satisfactory painting or plating thereof is avoided.

In some embodiments, the water-based composition comprises non-ionic surfactants being a mixture of polysorbate 85 and ethoxylated (6-8) tridecyl alcohol.

In various embodiments, the water-based composition is an oil-in-water emulsion.

In certain embodiments, the waxes are polyethylenes and/or polypropylenes which are either modified or not and are insoluble in water and are plastic (malleable) at 20° C. and melt above 45° C.

In a further aspect, the present invention relates to the use of polyalkylsiloxanes as a mold release agent in a metal casting process, wherein i) the polyalkylsiloxanes are a mixture of polyalkylsiloxanes as defined herein, ii) the polyalkylsiloxanes are polyalkylsiloxanes as defined herein, or iii) the polyalkylsiloxanes comprise a repeating unit according to the following general structure (III):

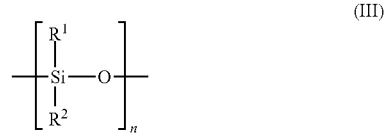

(III)

wherein n indicates the number of repeating units being in a range of from 5 to 10,000; wherein for each repeating unit the residue $R^1$ is independently selected from linear alkyl groups with less than 6 carbon atoms; and wherein for each repeating unit the residue $R^2$ is independently selected from hydrogen or linear or branched alkyl groups having 6 to 15 carbon atoms, 16 to 30 carbon atoms or 40 to 60 carbon atoms, while the fraction of repeating units with a residue $R^2$ being hydrogen is less than 0.1, being a linear or branched alkyl group having 16 to 30 is in a range of from 0.01-0.2, being a linear or branched alkyl group having 40 to 60 carbon atoms is in a range of from 0.01-0.2, and being a linear or branched alkyl group having 6 to 15 carbon atoms is in a range of from 0.6-0.98.

$R^1$ is defined as for general structure (I) and (II). $R^2$ may be defined as for the polyalkylsiloxanes of the invention described above.

In some embodiments, $R^2$ may be selected from the group consisting of linear or branched alkyl groups with 10 to 14 carbon atoms. In certain embodiments, $R^2$ is selected from the group consisting of hexyl, heptyl, octyl, nonyl, decyl, undecyl, and dodecyl. Preferably, $R^2$ is dodecyl.

According to some embodiments, residue $R^1$ of each repeating unit according to general structure (III) is a methyl group. In further embodiments, residue $R^1$ of at least 80% of the repeating units according to general structure (III) is a methyl group. In certain embodiments, residue $R^1$ of at least 80, 90, 95, 97.5, 99, or 99.5% of the repeating units according to general structure (III) is a methyl group.

In certain embodiments, the use of polyalkylsiloxanes as a mold release agent in a metal casting process concerns polyalkylsiloxanes as defined above, wherein the fraction of repeating units according to the general structure (III) with $R^2$ being a linear or branched alkyl group having 16 to 30 carbon atoms is at least 0.02, preferably at least 0.05, but preferably not higher than 0.15; the fraction of repeating units according to the general structure (III) with the $R^2$ being a linear or branched alkyl group having 40 to 60 carbon atoms is at least 0.02, preferably at least 0.05, but preferably not higher than 0.10; and/or the fraction of repeating units according to the general structure (III) with the residue $R^2$ being a linear or branched alkyl group having 6 to 15 carbon atoms is not higher than 0.96, preferably not higher than 0.90, but preferably at least 0.75.

In some embodiments, repeating units with $R^2$ falling within the scope of linear or branched alkyl groups with 40 to 60 carbon atoms have a fraction of 0.02-0.10, preferably about 0.05.

In various embodiments, repeating units with $R^2$ falling within the scope of linear or branched alkyl groups with 16 to 30 carbon atoms have a fraction of 0.02-0.15, preferably about 0.05.

In certain embodiments, repeating units with $R^2$ falling within the scope of linear or branched alkyl groups with 6 to 15 carbon have a fraction of 0.60-0.96 or 0.75-0.96, preferably 0.60-0.90 or 0.75-0.90.

In various embodiments, the use of polyalkylsiloxanes as a mold release agent in a metal casting process concerns polyalkylsiloxanes as defined above, wherein the molar ratio of repeating units according to the general structure (III) with the residue $R^2$ being a linear or branched alkyl group having 16 to 30 carbon atoms to those residues $R^2$ being a linear or branched alkyl group having 40 to 60 carbon atoms is in the range of from 2:3 to 3:2.

In some embodiments, the use of polyalkylsiloxanes as a mold release agent in a metal casting process concerns polyalkylsiloxanes as defined above, wherein the residue $R^1$ of each repeating unit according to general structure (II) is a methyl group; and the polyalkylsiloxane has a kinematic viscosity of 200 to 20000 mPa·s at 25° C., preferably of 200 to 7000 mPa·s at 25° C.

Furthermore, the polyalkylsiloxanes for use according to the present invention are preferably an oil.

The term "about", as used herein in relation to numerical values, means plus or minus 10% of the numerical value it refers to. Consequently, "about 50%" means in the range of 45% to 55%.

By "consisting of" is meant including, and limited to, whatever follows the phrase "consisting of". Thus, the phrase "consisting of" indicates that the listed elements are required or mandatory, and that no other elements may be present.

By "comprising" it is meant including, but not limited to, whatever follows the word "comprising". Thus, use of the term "comprising" indicates that the listed elements are required or mandatory, but that other elements are optional and may or may not be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention.

Other embodiments are within the following claims and non-limiting examples. All documents cited herein, are hereby incorporated by reference in their entirety.

EXAMPLES

Example 1

Preparation of Modified Polysiloxane

To a mixture of polymethylhydrosiloxane with the average formula $(CH_3)_3SiO(CH_3HSiO)_{25}Si(CH_3)_3$ (40 g, 602.5 mmol free Si—H), 1-dodecene (4.76 g, 28.3 mmol) and α-olefin with the average formula $CH_3(CH_2)_{40}CH\!=\!CH_2$ (16.32 g, 27.1 mmol, AlphaPlus C30+HA) was added 4 ppm of a $H_2PtCl_6$ solution in isopropanol (73 μL, 17.1 mg/mL). The mixture was heated to 80° C. resulting in an exotherm heating the mixture to 140° C. A mixture of 1-dodecene (74.64 g, 443.4 mmol) and α-olefin with the average formula $CH_3(CH_2)_{19}CH\!=\!CH_2$ (12.17 g, 43.4 mmol) was added at such a rate to keep the temperature at 140-150° C. After complete addition, the mixture was heated at 150° C. for 2 hours: FTIR analysis showed 5.0% remaining Si—H groups. The viscosity of the product was 6300 mPa·s.

Preparation of Die Casting Release Agent

The abovementioned modified polymethylsiloxane (30.5 g) was added to an emulsifier mixture (14.3 g). Under vigorous stirring, water was added to create the inversion point (7.0 g). Additional modified polymethylsiloxane (59.1 g) was added slowly under vigorous stirring. After 10 minutes water (89.1 g) was added slowly followed by addition of Acticide MV14 (Thor Chemie, 0.02 g). 76 gram of this emulsion was added to a mixture of Mayco base RP8765 (Dover Chemical Corporation, 2.6 g) and water (120.5 gram). To this mixture was added SAG 10E (Momentive, 0.1 gram) and Acticide MBS (Thor Chemie 0.8 g).

Pressure Die Casting Tests

The pressure die casting emulsion was tested against the wax-containing lubricant Deltacast CP-579 (23% solids, 0.8% dilution in water) which gives lubricant build-up during its use. The new lubricant (17% solids, 1.0% dilution in water) gave good release and afforded good clean castings without observable lubricant build-up on the die or spray nozzles.

Example 2

Preparation of Modified Polysiloxane

Preparation similar to Example 1 with a mixture of polymethylhydrosiloxane with the average formula $(CH_3)_3SiO(CH_3HSiO)_{25}Si(CH_3)_3$ (40 g, 602.5 mmol free Si—H), 1-dodecene (4.65 g, 27.7 mmol) and α-olefin with the average formula $CH_3(CH_2)_{40}CH\!=\!CH_2$ (19.59 g, 32.5 mmol). Addition of a mixture of 1-dodecene (72.93 g, 433.3 mmol) and α-olefin with the average formula $CH_3(CH_2)_{19}CH\!=\!CH_2$ (13.69 g, 48.8 mmol). FTIR analysis showed 4.7% remaining Si—H groups. The viscosity of the product was 14000 mPa·s.

Preparation of die casting release agent was performed similar to Example 1.

Example 3

Preparation of Modified Polysiloxane

Preparation similar to Example 1 with a mixture of polymethylhydrosiloxane with the average formula $(CH_3)_3SiO(CH_3HSiO)_{25}Si(CH_3)_3$ (60 g, 903.8 mmol free Si—H), 1-dodecene (10.27 g, 61.0 mmol), α-olefin with the average formula $CH_3(CH_2)_{19}CH\!=\!CH_2$ (3.76 g, 12.2 mmol) and α-olefin with the average formula $CH_3(CH_2)_{30}CH\!=\!CH_2$ (3.42 g, 8.1 mmol). Addition of a mixture of 1-dodecene (92.4 g, 549.0 mmol), α-olefin with the average formula $CH_3(CH_2)_{19}CH\!=\!CH_2$ (33.88 g, 109.8 mmol) and α-olefin with the average formula $CH_3(CH_2)_{30}CH\!=\!CH_2$ (3.42 g, 8.1 mmol). FTIR analysis showed 5.5% remaining Si—H groups. The viscosity of the product was 9100 mPa·s.

Preparation of die casting release agent was performed similar to Example 1.

The invention claimed is:

1. A mixture of polyalkylsiloxanes obtained through a hydrosilylation reaction wherein a mixture of monounsaturated olefins consisting of:
   1-20 mol % of olefins with 40 to 60 carbon atoms,
   1-20 mol % of olefins with 16 to 30 carbon atoms, and
   60-98 mol % of olefins with 6 to 15 carbon atoms
   is reacted with an amount of one or more polyalkylhydrosiloxanes in the presence of a hydrosilylation catalyst
   wherein each of the one or more polyalkylhydrosiloxanes comprises a repeating unit according to the general structure (I):

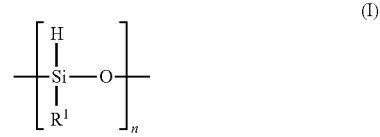

wherein n indicates the number of repeating units and ranges from 5 to 10,000;
   wherein the residue $R^1$ is selected from linear or branched alkyl groups with less than 6 carbon atoms.

2. The mixture of polyalkylsiloxanes according to claim 1, wherein the amount of polyalkylhydrosiloxanes is at least 60% of the stoichiometric amount, but not more than the stoichiometric amount relative to the mixture of monounsaturated olefins.

3. The mixture of polyalkylsiloxanes according to claim 1, wherein the one or more polyalkylhydrosiloxanes includes polymethylhydrosiloxanes polymethylhydrosiloxanes.

4. The mixture of polyalkylsiloxanes according to claim 1, wherein at least 80 mol % of the mixture of monounsaturated olefins are selected from α-olefins.

5. The mixture of polyalkylsiloxanes according to claim 1, wherein the temperature at which the mixture of monounsaturated olefins is reacted with the one or more polyalkylhydrosiloxanes is in a range of from 80° C. to 180° C. for a time sufficient to yield not more than 10 mol % Si—H bonds in the mixture of polyalkylsiloxanes.

6. The mixture of polyalkylsiloxanes according to claim 1, wherein the hydrosilylation catalyst is a platinum catalyst.

7. The mixture of polyalkylsiloxanes according to claim 1, wherein an inert liquid vehicle that acts as a solvent for the one or more polyalkylhydrosiloxanes and/or the mixture of monounsaturated olefins is present in an amount of less than 20 wt.-%; and/or the mixture of polyalkylsiloxanes is an oil.

8. The mixture of polyalkylsiloxanes according to claim 7, wherein the inert liquid vehicle is present in an amount of less than 1 wt.-%; and/or the mixture of polyalkylsiloxanes is an oil.

9. The mixture of polyalkylsiloxanes according to claim 1, wherein the mixture of polyalkylsiloxanes is an oil.

10. The mixture of polyalkylsiloxanes according to claim 1, wherein at least 80 mol % of the repeating units of the one or more polyalkylhydrosiloxanes according to the general structure (I) have a residue $R^1$ that is a methyl group.

11. A water-based metal casting mold release agent composition comprising:
1) 1-50 wt.-% of a mixture of polyalkylsiloxanes according to claim 1,
2) 1-15 wt.-% of a non-ionic surfactant having an HLB value of at least 8, and
3) less than 20 wt.-% of waxes.

12. A polyalkylsiloxane comprising repeating units according to general structure (II):

wherein n represents the number of repeating units comprised in the polyalkylsiloxane, and n is an integer of 5 to 10,000;
wherein residue $R^1$ is selected from the group consisting of linear or branched alkyl groups with less than 6 carbon atoms; and
a) in 1-20% of the repeating units, $R^2$ is selected from the group consisting of linear or branched alkyl groups with 40 to 60 carbon atoms;
b) in 1-20% of the repeating units, $R^2$ is selected from the group consisting of linear or branched alkyl groups with 16 to 30 carbon atoms;
c) in 60-98% of the repeating units, $R^2$ is selected from the group consisting of linear or branched alkyl groups with 6 to 15 carbon atoms; and
d) in 0-10% of the repeating units, $R^2$ is H.

13. The polyalkylsiloxane according to claim 12, wherein in c), $R^2$ is selected from the group consisting of linear or branched alkyl groups with 10 to 14 carbon atoms.

14. The polyalkylsiloxane according to claim 12, wherein
a) in 2-10% of the repeating units, $R^2$ is selected from the group consisting of linear or branched alkyl groups with 40 to 60 carbon atoms;
b) in 2-15% of the repeating units, $R^2$ is selected from the group consisting of linear or branched alkyl groups with 16 to 30 carbon atoms,
c) in 75-96% of the repeating units, $R^2$ is selected from the group consisting of linear or branched alkyl groups with 6 to 15 carbon atoms.

15. The polyalkylsiloxane according to claim 12, wherein the polyalkylsiloxane has a ratio of the repeating units according to a) to the repeating units according to b) in a range of from 2:3 to 3:2.

16. The polyalkylsiloxane according to claim 12, wherein the polyalkylsiloxane is an oil.

17. The polyalkylsiloxane according to claim 12, wherein $R^1$ of each repeating unit according to general structure (II) is a methyl group.

18. A water-based metal casting mold release agent composition comprising:
1) 1-50 wt.-% of at least one polyalkylsiloxane according to claim 12,
2) 1-15 wt.-% of a non-ionic surfactant having an HLB value of at least 8, and
3) less than 20 wt.-% of waxes.

19. A metal casting process comprising:
A.) applying a mold release agent to a metal-casting mold, the mold release agent comprising at least one polyalkylsiloxane selected from:
i) a polyalkylsiloxane mixture obtained through a hydrosilylation reaction wherein a mixture of monounsaturated olefins consisting of 1-20 mol % of olefins with 40 to 60 carbon atoms, 1-20 mol % of olefins with 16 to 30 carbon atoms, and 60-98 mol % of olefins with 6 to 15 carbon atoms is reacted with an amount of one or more polyalkylhydrosiloxanes in the presence of a hydrosilylation catalyst, wherein each of the one or more polyalkylhydrosiloxanes comprises a repeating unit according to the general structure (I):

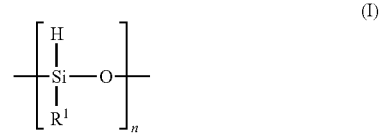

wherein n indicates the number of repeating units and ranges from 5 to 10,000; and
wherein the residue $R^1$ is selected from linear or branched alkyl groups with less than 6 carbon atoms;
ii) a polyalkylsiloxane comprising repeating units according to general structure (II):

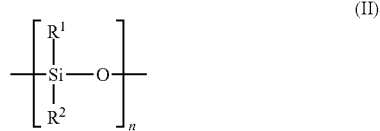

wherein n represents the number of repeating units comprised in the polyalkylsiloxane, and n is an integer of 5 to 10,000;
wherein residue $R^1$ is selected from the group consisting of linear or branched alkyl groups with less than 6 carbon atoms;
a) in 1-20% of the repeating units, $R^2$ is selected from the group consisting of linear or branched alkyl groups with 40 to 60 carbon atoms;

b) in 1-20% of the repeating units, $R^2$ is selected from the group consisting of linear or branched alkyl groups with 16 to 30 carbon atoms;
c) in 60-98% of the repeating units, $R^2$ is selected from the group consisting of linear or branched alkyl groups with 6 to 15 carbon atoms; and
d) in 0-10% of the repeating units, $R^2$ is H;
iii) a polyalkylsiloxane comprise a repeating unit according to the following general structure (Ill):

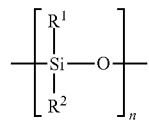

(III)

wherein n indicates the number of repeating units being in a range of from 5 to 10,000;
wherein for each repeating unit, the residue $R^1$ is independently selected from linear alkyl groups with less than 6 carbon atoms; and
wherein for each repeating unit, the residue $R^2$ is independently selected from hydrogen, linear or branched alkyl groups having 6 to 15 carbon atoms, 16 to 30 carbon atoms or 40 to 60 carbon atoms,
wherein, expressed as a fraction of 1, amount of repeating units with a residue $R^2$ being hydrogen is less than 0.1, being a linear or branched alkyl group having 16 to 30 carbon atoms is in a range of from 0.01-0.2, being a linear or branched alkyl group having 40 to 60 carbon atoms is in a range of from 0.01-0.2, and being a linear or branched alkyl group having 6 to 15 carbon atoms is in a range of from 0.6-0.98; and
mixtures thereof;
B.) casting a metal in the metal-casting mold to form a casting;
C.) releasing the casting from the metal-casting mold.
20. The metal casting process of claim 19, further comprising step D.) painting or plating the casting, wherein after step C.) and prior to step D.), the casting is not cleaned; and wherein the mold release agent is wax-free.

* * * * *